United States Patent
Tsukamoto et al.

(10) Patent No.: US 11,526,740 B2
(45) Date of Patent: Dec. 13, 2022

(54) OPTIMIZATION APPARATUS AND OPTIMIZATION METHOD

(71) Applicant: FUJITSU LIMITED, Kawasaki (JP)

(72) Inventors: Sanroku Tsukamoto, Setagaya (JP); Hirotaka Tamura, Yokohama (JP); Satoshi Matsubara, Machida (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 16/874,735

(22) Filed: May 15, 2020

(65) Prior Publication Data
US 2020/0380346 A1 Dec. 3, 2020

(30) Foreign Application Priority Data
May 29, 2019 (JP) .............................. JP2019-100622

(51) Int. Cl.
*G06N 3/063* (2006.01)
*G06N 3/04* (2006.01)
*G06N 3/08* (2006.01)

(52) U.S. Cl.
CPC ........... *G06N 3/063* (2013.01); *G06N 3/0472* (2013.01); *G06N 3/08* (2013.01)

(58) Field of Classification Search
CPC ......... G06N 3/063; G06N 3/0472; G06N 3/08
See application file for complete search history.

(56) References Cited

U.S. PATENT DOCUMENTS

| | | | |
|---|---|---|---|
| 2015/0142807 A1* | 5/2015 | Hofmann | G06N 3/02 707/759 |
| 2017/0068632 A1 | 3/2017 | Yoshimura et al. | |

(Continued)

FOREIGN PATENT DOCUMENTS

| | | |
|---|---|---|
| JP | 2001-331839 A | 11/2001 |
| JP | 2017-219952 A | 12/2017 |

(Continued)

OTHER PUBLICATIONS

Salehinejad Hojjat et al., "Ising-dropout: A Regularization Method for Training and Compression of Deep Neural Networks", ICASSP 2019—2019 IEEE International Conference on Acoustics, Speech and Signal Processing (ICASSP), IEEE, May 12, 2019, pp. 3602-3606, XP033565493.

(Continued)

*Primary Examiner* — Ying Yu Chen
(74) *Attorney, Agent, or Firm* — Fujitsu Patent Center

(57) ABSTRACT

An optimization method includes holding combining destination information indicating a combining destination neuron to be combined with a target neuron which is one of a plurality of neurons corresponding to a plurality of spins of an Ising model obtained by converting an optimization problem, the target neuron being different in a plurality of neuron circuits; holding a weighting coefficient indicating a strength of combining between the target neuron and the combining destination neuron, and outputting the weighting coefficient corresponding to the combining destination information; permitting an update of a value of the target neuron by using the weighting coefficient output and the value of the update target neuron, and outputting a determination result indicating whether or not the value of the target neuron is permitted to be updated; and determining the update target neuron based on the plurality of determination results respectively output and outputting the update target information.

4 Claims, 9 Drawing Sheets

(56) References Cited

U.S. PATENT DOCUMENTS

2017/0351947 A1* 12/2017 Tamura .................. G06N 3/063
2017/0351949 A1   12/2017 Matsubara et al.
2018/0018563 A1    1/2018 Tsukamoto et al.
2018/0075342 A1*   3/2018 Tamura ................ G06N 3/0445
2018/0107172 A1*   4/2018 Takatsu .............. G05D 23/1917

FOREIGN PATENT DOCUMENTS

JP        2018-10474 A        1/2018
WO        2015/132883 A1      9/2015

OTHER PUBLICATIONS

Sanroku Tsukamoto et al., "An Accelerator Architecture for Combinatorial Optimization Problems", Fujitsu Scientific & Technical Journal(FSTJ), vol. 53, No. 5, Sep. 1, 2017, pp. 8-13, XP055673462.
EESR—Extended European Search Report of European Patent Application No. 20175618.6 dated Oct. 30, 2020.

* cited by examiner

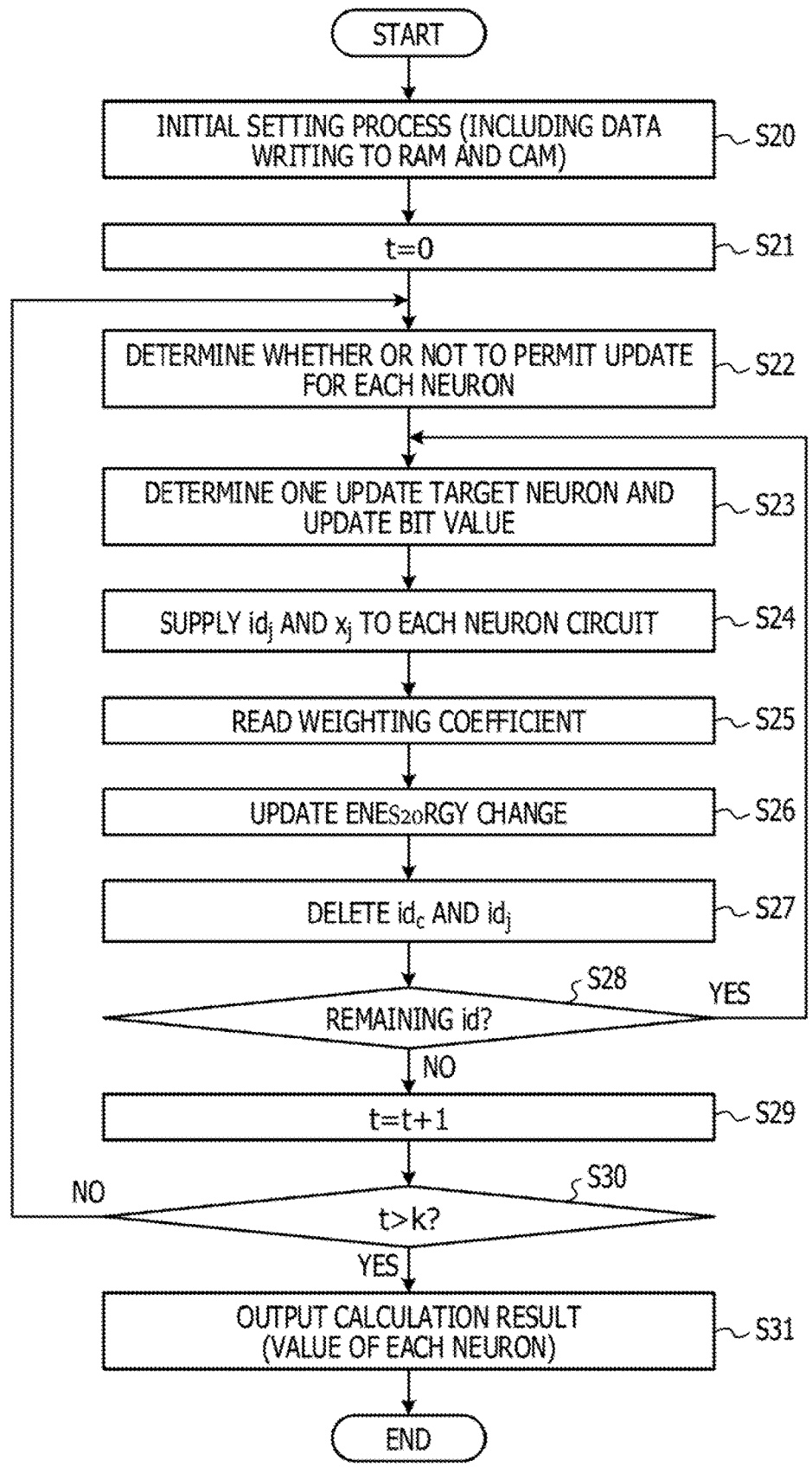

OPTIMIZATION APPARATUS AND OPTIMIZATION METHOD

CROSS-REFERENCE TO RELATED APPLICATION

This application is based upon and claims the benefit of priority of the prior Japanese Patent Application No. 2019-100622, filed on May 29, 2019, the entire contents of which are incorporated herein by reference.

FIELD

The embodiments discussed herein are related to an optimization apparatus and an optimization method.

BACKGROUND

As a method of solving a multivariate combination optimization problem which is not easily handled by a Neumann-type computer, there is an optimization apparatus (may also be referred to as an Ising machine or a Boltzmann machine) using an Ising-type energy function. The optimization apparatus calculates a problem to be calculated by replacing the problem with an Ising model which is a model representing a behavior of a spin of a magnetic body.

The optimization apparatus is also capable of performing modeling by, for example, using a neural network. In this case, each of a plurality of state variables which correspond to a plurality of spins included in the Ising model functions as a neuron which outputs 0 or 1 in accordance with a value of another state variable and a weighting coefficient indicating a magnitude of interaction between a value of the other state variable and the own state variable. The optimization apparatus uses, for example, a probabilistic search method, such as simulated annealing, so as to find a combination of values of respective state variables from which a minimum value among values (referred to as energy) of the energy function as described above is obtained, as a solution.

In the related art, there is an optimization apparatus which calculates a combination of values of respective state variables at which energy is minimized by performing simulated annealing using a digital circuit.

There is a technology of adding or deleting a neuron in accordance with a firing state by learning in a technology using a neural network.

As Related art, for example, Japanese Laid-open Patent Publication No. 2001-331839, Japanese Laid-open Patent. Publication No. 2017-219952, Japanese Laid-open Patent Publication No. 2018-10474, and International Publication No. WO 2015/132883 are disclosed.

SUMMARY

According to an aspect of the embodiments, an optimization apparatus includes a plurality of neuron circuits respectively including: a first memory that stores combining destination information indicating a combining destination neuron to be combined with a target neuron which is one of a plurality of neurons corresponding to a plurality of spins of an Ising model obtained by converting an optimization problem, receives update target information indicating an update target neuron for which a value is to be updated, and outputs a signal indicating the combining destination information which coincides with the update target information, a second memory that stores a weighting coefficient indicating a strength of combining between the target neuron and the combining destination neuron, and outputs the weighting coefficient corresponding to the combining destination information indicated by the signal output from the first memory, and a computing circuit that stochastically permits an update of a value of the target neuron by using the weighting coefficient output from the second memory and the value of the update target neuron, and outputs a determination result indicating whether or not the value of the target neuron is permitted to be updated, and respectively configured to output the determination result for the target neurons different from each other; and an update control circuit configured to determine the update target neuron based on a plurality of determination results output from the plurality of neuron circuits, update the value of the update target neuron, and output the update target information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a flowchart illustrating a flow of an operation of an example of the optimization apparatus according to the third embodiment.

DESCRIPTION OF EMBODIMENTS

Figure 1:
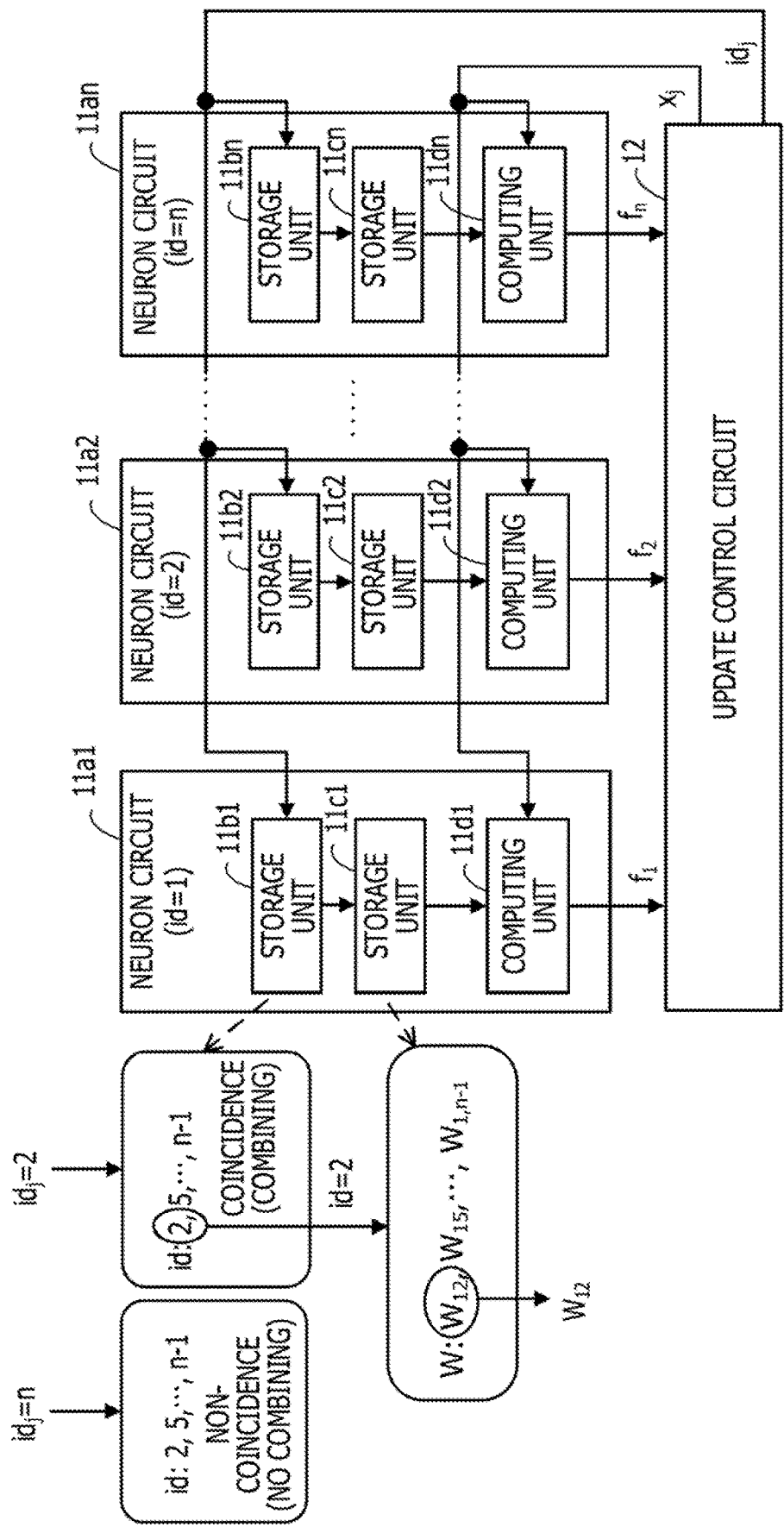
FIG. 1 is a diagram illustrating an example of an optimization apparatus according to a first embodiment.

Meanwhile, the number of weighting coefficients increases as the number of state variables increases in response to an increase in the scale of the problem. For example, in a total combining type optimization apparatus (for example, Japanese Laid-open Patent Publication No. 2017-219952 and Japanese Laid-open Patent Publication No, 2018-10474) which is superior in flexibility when replacing the problem with an Ising model and which may consider interaction between all state variables, the number of weighting coefficients increases rapidly as the number of state variables increases.

For this reason, for example, in a case where the optimization apparatus is realized by a semiconductor integrated circuit with one chip, a capacity of a storage unit which stores the weighting coefficient increases. There is a method of storing a weighting coefficient in a memory outside an optimization apparatus or a method of configuring an optimization apparatus by using a plurality of chips, but there is a problem that a calculation speed is reduced due to reading of a weighting coefficient from the memory or a time for communication between the chips.

As one aspect, the present disclosure provides an optimization apparatus and an optimization method capable of reducing a capacity of a storage unit which stores a weighting coefficient.

Hereinafter, embodiments of the present disclosure will be described with reference to the accompanying drawings.

An optimization apparatus described below searches for a combination of bit values of each neuron when energy becomes minimum among combinations of values (hereinafter, referred to as "bit values") of a plurality of neurons corresponding to a plurality of spins in an Ising model obtained by converting an optimization problem.

An Ising-type energy function E(x) is defined by, for example, the following equation (1), $$E(x) = -\sum_{<i,j>} W_{ij} x_i x_j - \sum_i b_i x_i \quad (1)$$

A first term at the right side is obtained by accumulating a product of bit values (0 or 1) of two neurons and a weighting coefficient, without overlap and leakage, for all combinations of all neurons, $x_i$ is a variable (also referred to as a state variable) representing a bit value of a neuron of i by identification information (hereinafter, referred to as id), and $x_j$ is a variable representing a bit value of a neuron of id=j. $W_{ij}$ is a weighting coefficient indicating a magnitude (a strength of combining) of interaction of neurons of id=i, j. In this case, $W_{ii}=0$ is satisfied. $W_{ij}=W_{ji}$ is satisfied in many cases (for example, a coefficient matrix of weighting coefficients is a symmetric matrix in many cases). The $W_{ij}$ has a predetermined bit width (for example, 16 bits, 32 bits, 64 bits, 128 bits, or the like).

The second item on the right side is obtained by calculating a sum of a product of bias coefficients of all neurons and bit values of the neurons. $b_i$ represents a bias coefficient of the neuron with id=i.

When $x_i$ changes to $1-x_i$, an increment of $x_i$ is represented as $\Delta x_i=(1-x_i)-x_i=1-2x_i$. An energy change $\Delta E_i$ in response to spin reversal (a change in a bit value of a neuron) is represented by the following equation (2).

$$\Delta E_i = E(x)|_{x_i \to 1-x_i} - E(x) = -\Delta x_i \left( \sum_j W_{ij} x_j + b_i \right) = -\Delta x_i h_i \quad (2)$$

In the equation (2), $\Delta x_i$ becomes $-1$ when $x_i$ changes from 1 to 0, and $\Delta x_i$ becomes 1 when $x_i$ changes from 0 to 1, $h_i$ is called a local field, and the product of $h_i$ by a sign (+1 or −1) according to $\Delta x_i$ is $\Delta E_i$, When $h_i$ is less than 0, by updating $x_i$ from 1 to 0, total energy is reduced, and when $h_i$ is greater than 0, the total energy is reduced by updating $x_i$ from 0 to 1.

A change in $h_i$ ($\Delta h_i$) when $x_j$ is changed from 0 to 1 is expressed by $+W_{ij}$, and $\Delta h_i$ when $x_j$ is changed from 1 to 0 is expressed by $-W_{ij}$. Therefore, when a bit value of a neuron updated according to state transition is 1 or 0, $h_i$ may be updated by adding or subtracting $W_{ij}$ to or from the original $h_i$.

First Embodiment

FIG. 1 is a diagram illustrating an example of an optimization apparatus according to a first embodiment.

An optimization apparatus 10 according to the first embodiment includes neuron circuits 11a1, 11a2, ..., and 11an, and an update control circuit 12. In the example in FIG. 1, an id indicating any one of n neurons is assigned to each of the neuron circuits 11a1 to 11an. In the example in FIG. 1, id=1 is assigned to the neuron circuit 11a1, id=2 is assigned to the neuron circuit 11a2, and id=n is assigned to the neuron circuit 11an.

The neuron circuit 11a1 includes storage units 11b1 and 11c1, and a computing unit 11c11.

The storage unit 11b1 holds combining destination information indicating a combining destination neuron to be combined with a target neuron which is one of a plurality of (n) neurons. The storage unit 11b1 receives update target information indicating an update target neuron for which a value is to be updated, and outputs a signal indicating combining destination information which coincides with the update target information.

FIG. 1 illustrates an example of combining destination information held in the storage unit 11b1. A target neuron in the neuron circuit 11a1 is a neuron with id=1, and the combining destination information indicates a neuron with which the neuron with id=1 is combined. In the example in FIG. 1, ids (2, 5, ..., and n−1) of neurons to be combined with the neuron with id=1 is held in the storage unit 11b1 as the combining destination information. In a case of receiving $id_j=2$ as update target information (id), the storage unit 11b1 holds combining destination information (id=2) which coincides with $id_j=2$, so that a signal indicating id=2 is output. In a case where id=n is received, the storage unit 11b1 does not hold the combining destination information which coincides with $id_3=n$, so that the storage unit 11b1 does not output a signal indicating combining destination information.

The storage unit 11b1 may be realized, for example, by a content-addressable memory (CAM). The storage unit 11b1 may be realized by using a random-access memory (RAM), a comparator, or the like.

The storage unit 11c1 holds a weighting coefficient indicating a strength of combining between a target neuron and a combining destination neuron, and outputs a weighting coefficient corresponding to the combining destination information indicated by the signal output from the storage unit 11b1.

FIG. 1 illustrates an example of a weighting coefficient held in the storage unit 11c1. In a case where the neuron with id=1 is combined with the neuron with id=2, 5, and n−1 described above, the storage unit 11c1 holds $W_{12}, W_{15}, \ldots$, and $W_{1,n-1}$ as the weighting coefficient. In a case where the storage unit 11b1 outputs a signal indicating id=2, the storage unit 11c1 outputs $W_{12}$.

The storage unit 11c1 may be realized by, for example, a RAM, a register, or the like.

The combining destination information or the weighting coefficient is obtained, for example, by a control apparatus (not illustrated) converting an optimization problem into an Ising model represented by an energy function such as the equation (1). The combining destination information or the weighting coefficient is supplied from the control apparatus to the optimization apparatus 10, in an initial setting process of the optimization apparatus 10, and is written into the storage units 11b1 and 11c1.

The computing unit 11d1 uses the weighting coefficient output from the storage unit 11c1 and a bit value of the update target neuron so as to stochastically permit update of a value of the target neuron and output a determination result ($f_1$) indicating whether or not the update of the value of the target neuron is permitted.

For example, the computing unit 11d1 updates the local field ($h_1$) described above by using the weighting coefficient output from the storage unit 11c1 and the bit value of the update target neuron, and updates an energy change ($\Delta E_1$) based on the equation (2). The computing unit 11d1 determines whether or not to permit an update of the bit value of the neuron with id=1 based on a thermal noise determined based on a temperature parameter and a random number and $\Delta E_1$. The temperature parameter is input from, for example, a control circuit (not illustrated) or an update control circuit 12.

In a case where $h_i$ is less than 0 and $x_i$ is 1 for the neurons with id=i as described above, a total energy is reduced by updating $x_i$ from 1 to 0. In a case where $h_i$ is greater than 0 and $x_i$ is equal to 0, the total energy is reduced by updating $x_i$ from 0 to 1. On the other hand, in a case where $h_i$ is less than 0 and $x_i$ is 0, the total energy is increased by updating $x_i$ from 0 to 1. In a case where $h_i$ is greater than 0 and $x_i$ is 1, the total energy is increased by updating $x_i$ from 1 to 0.

In order to reduce a state of the Ising model from being trapped in a local solution which is not a ground state (an optimum solution), the computing unit 11d1 also generates a state transition in which energy is increased, with a predetermined probability, by using the thermal noise. The thermal noise has a larger noise width as the temperature parameter is larger. In a case where simulated annealing is performed, the temperature parameter is controlled to be gradually smaller.

The computing unit 11d1 is realized by a logic circuit of calculating $\Delta E_i$, a circuit of generating a thermal noise by using a random number generator such as linear-feedback shift registers (LFSRs), a comparator.

The other neuron circuits 11a2 to 11an have the same elements as those of the neuron circuit 11a1, and output determination results for different target neurons. For example, the neuron circuit 11a2 to which id=2 is assigned includes storage units 11b2 and 11c2 and a computing unit 11d2, and outputs a determination result ($f_2$) indicating whether or not an update of a bit value of a neuron having id=2 is permitted. The neuron circuit 11an to which id=n is assigned includes storage units 11bn, 11cn, and a computing unit 11dn, and outputs a determination result ($f_n$) indicating whether or not an update of a bit value of a neuron having id=n is permitted.

The update control circuit 12 determines one update target neuron based on the determination result ($f_1$ to $f_n$) output from the neuron circuits 11a1 to 11an, updates a bit value ($x_j$) of the update target neuron, and outputs update target information (id).

For example, in a case where there is a plurality of neurons permitted to be updated, the update control circuit 12 is realized by using a selection circuit of selecting one as an update target neuron based on a random number, a register of holding a bit value of each neuron, or the like. An example of the selection circuit of selecting one as an update target neuron based on a random number is described in FIGS. 5 to 7 in Japanese Laid-open Patent Publication No. 2018-041351, for example.

Hereinafter, an operation example of the optimization apparatus 10 according to the first embodiment will be described.

First, in an initial setting process, combining destination information or a weighting coefficient supplied from a control apparatus (not illustrated) is written into the storage units 11b1 to 11bn and 11c1 to 11cn. An initial value of a local field for each neuron is set in each of the computing units 11d1 to 11dn by the control apparatus, and the initial value of the bit value of each neuron is set in a register (not illustrated) of the update control circuit 12. In a case where simulated annealing is performed, an annealing condition (such as a change schedule of a temperature parameter or the number of repetitions of calculation) is set by the control apparatus.

Thereafter, the computing units 11d1 to 11dn calculate an energy change based on the bit value of each neuron or an initial value of a local field obtained by the initial setting process. The computing units 11d1 to 11dn output a determination result ($f_1$ to $f_n$) indicating whether or not to permit an update based on the calculated energy change and thermal noise for each neuron. In the following description, it is assumed that an update of a neuron of id=i is permitted in a case where $f_i=1$.

The update control circuit 12 determines an update target neuron based on $f_1$ to $f_n$ output from the neuron circuits 11a1 to 11an. In a case where there are a plurality of neurons permitted to be updated, the update control circuit 12 determines one as an update target neuron, for example, based on a random number. The update control circuit 12 updates the bit value ($x_j$) of the update target neuron, and outputs update target information ($id_j$). In a case where there is no neuron permitted to be updated, the update of the bit value is not performed.

In order to reduce that a solution is restricted to the local solution, the computing units 11d1 to 11dn may add an offset value to the energy change and increase the offset value every time a situation in which a bit value is updated does not occur so as to promote the update.

In a case where the update control circuit 12 outputs $id_j$ and in a case where there is combining destination information corresponding to $id_j$, the storage units 11b1 to 11bn output a signal indicating the combining destination information. For example, in a case where $id_3=2$ and the storage unit 11b1 holds id=2 as the combining destination information as described above, the storage unit 11b1 outputs a signal indicating id=2.

The storage units 11c1 to 11cn output a weighting coefficient corresponding to combining destination information indicated by the signal output from the storage units 11b1 to 11bn.

The computing units 11d1 to 11dn update a local field based on the weighting coefficient output from the storage units 11c1 to 11cn and $x_j$, and update the energy change. Thereafter, the output of $f_1$ to $f_n$ based on the updated energy change and thermal noise, the determination of an update target neuron, and the update of $x_j$ are repeated.

In a case where simulated annealing is performed, the process described above is repeated for a predetermined number of times while gradually decreasing thermal noise. The bit value of each neuron obtained after the process described above is repeated the predetermined number of times is output as a solution to the optimization problem. The update control circuit 12 may update the energy by using the energy change due to update of the update target neuron, and may hold a bit value of each neuron when a minimum value and a minimum value are obtained in a case where the energy is the minimum value so far. In this case, a bit value of each neuron when the energy held at the time when the repetition number of the process described above reaches a predetermined number of times is the minimum value may be output as a solution.

As described above, in the optimization apparatus 10 according to the first embodiment, a weighting coefficient between neurons without combining are not held in the storage units 11c1 to 11cn. For example, in a case where the neuron with id=1 and the neuron with id=n are not combined, the weighting coefficient ($W_{1n}$) is 0. In this case, when i=1 and j=n in the equation (1), $W_{1n}x_1x_n=0$ regardless of values of $x_1$ and $x_n$, so $W_{1n}$ does not affect the energy. For this reason, the storage unit 11c1 may not hold $W_{1n}$.

By not holding such weighting coefficient, it is possible to reduce a capacity of the storage units 11c1 to 11cn. Therefore, it is possible to calculate a larger scale optimization problem in the optimization apparatus 10 with one chip, for example.

Although the combining destination of each neuron varies depending on the problem, it is possible to cope with various combining states by changing the holding contents of the storage units 11b1 to 11bn and 11c1 to 11cn in accordance with the problem.

Second Embodiment

Figure 2:
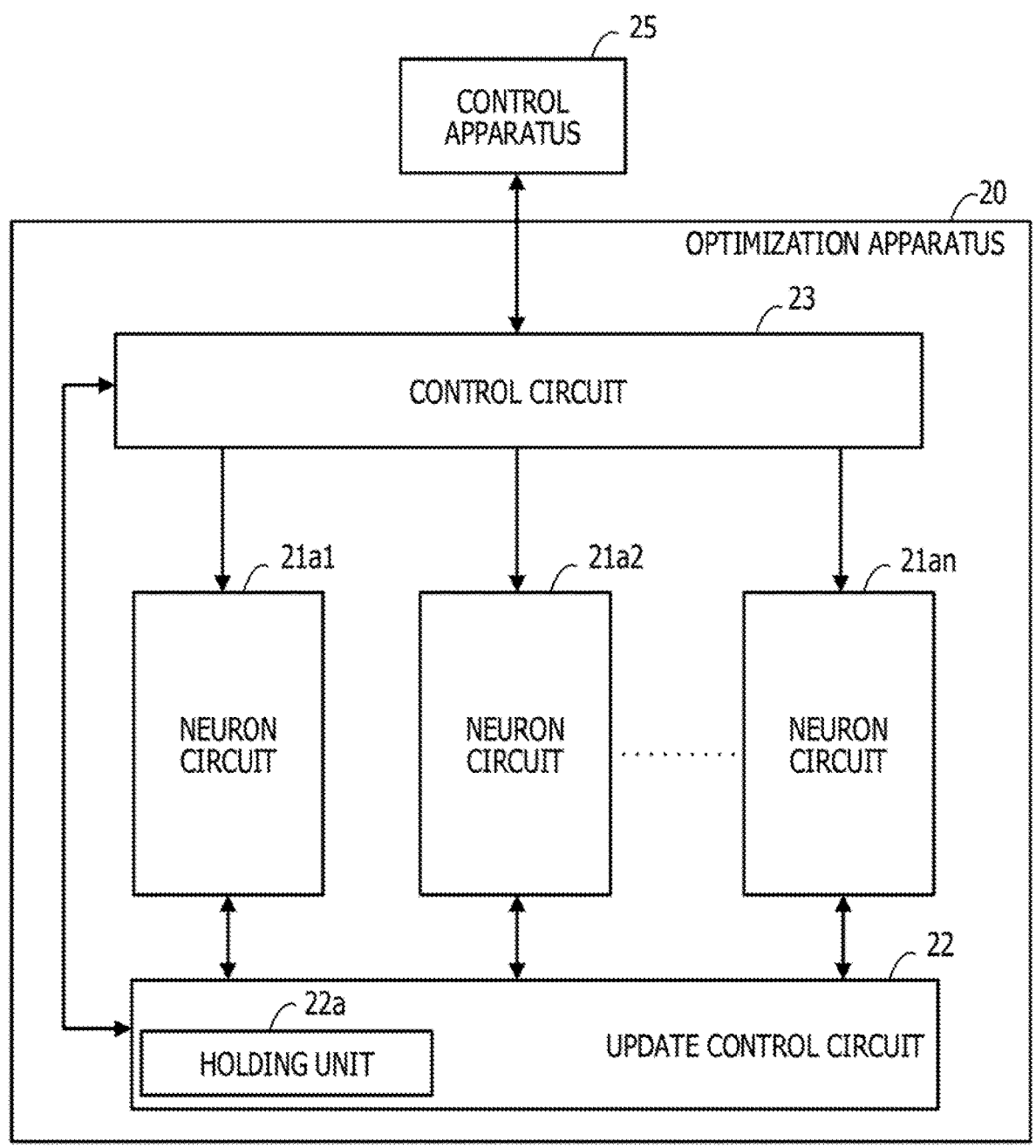
FIG. 2 is a diagram illustrating an example of an optimization apparatus according to a second embodiment.

FIG. 2 is a diagram illustrating an example of an optimization apparatus according to a second embodiment.

An optimization apparatus 20 according to the second embodiment includes neuron circuits 21a1, 21a2, . . . , and 21an, an update control circuit 22, and a control circuit 23. The optimization apparatus 20 is coupled to a control apparatus 25.

The neuron circuits 21a1 to 21an perform the same function as the neuron circuits 11a1 to 11an illustrated in FIG. 1. A circuit example of the neuron circuits 21a1 to 21an will be described below.

The update control circuit 22 performs the same functions as those of the update control circuit 12 illustrated in FIG. 1. The update control circuit 22 includes, for example, a holding unit 22a which holds a bit value of each neuron. The holding unit 22a may be realized by, for example, a register, a RAM, or the like.

The control circuit 23 performs an initial setting process or the like of the optimization apparatus 20 based on information supplied from the control apparatus 25. In a case of performing simulated annealing, the control circuit 23 reduces a value of a temperature parameter, for example, every time a process of determining an update target neuron is repeated for a number of times based on an annealing condition.

After the process of determining the update target neuron is repeated a predetermined number of times, the control circuit 23 obtains a bit value of each neuron held in the holding unit 22a, and transmits the obtained bit value to the control apparatus 25 as a solution to the optimization problem.

In a case where the holding unit 22a holds a bit value of each neuron when the minimum value or the minimum value of the energy is obtained, the control circuit 23 may obtain information after the process of determining the update target neuron is repeated the predetermined number of times, and transmit the information to the control apparatus 25.

The control circuit 23 may be realized by an application specific electronic circuit such as an application-specific integrated circuit (ASIC), a field-programmable gate array (FPGA), for example. The control circuit 23 may be a processor such as a central processing unit (CPU), a digital signal processor (DSP). In such a case, the processor performs the process described above by executing a program stored in a memory (not illustrated).

An element of performing a part or all of the functions of the control circuit 23 may be included in the update control circuit 22 or the control apparatus 25.

The control apparatus 25 converts the optimization problem into an Ising model based on information of the optimization problem inputted by a user (formulates into an energy function in the equation (1)). Information of the converted Ising model includes a weighting coefficient and a bias coefficient. Based on the weighting coefficient, the control apparatus 25 transmits an id of a neuron of a combining destination for each neuron to the optimization apparatus 20 as combining destination information. The control apparatus 25 transmits an initial value of a local field (for example, a bias coefficient), a weighting coefficient for which a value is not 0, an annealing condition, and the like to the optimization apparatus 20. In a case of receiving the solution (the bit value of each neuron) from the optimization apparatus 20, the control apparatus 25 may display the solution on a display apparatus (not illustrated).

The control apparatus 25 may be a computer such as a personal computer (PC) or a processor such as a CPU or a DSP.

(Example of Neuron Circuits 21a1 to 21an)

Figure 3:
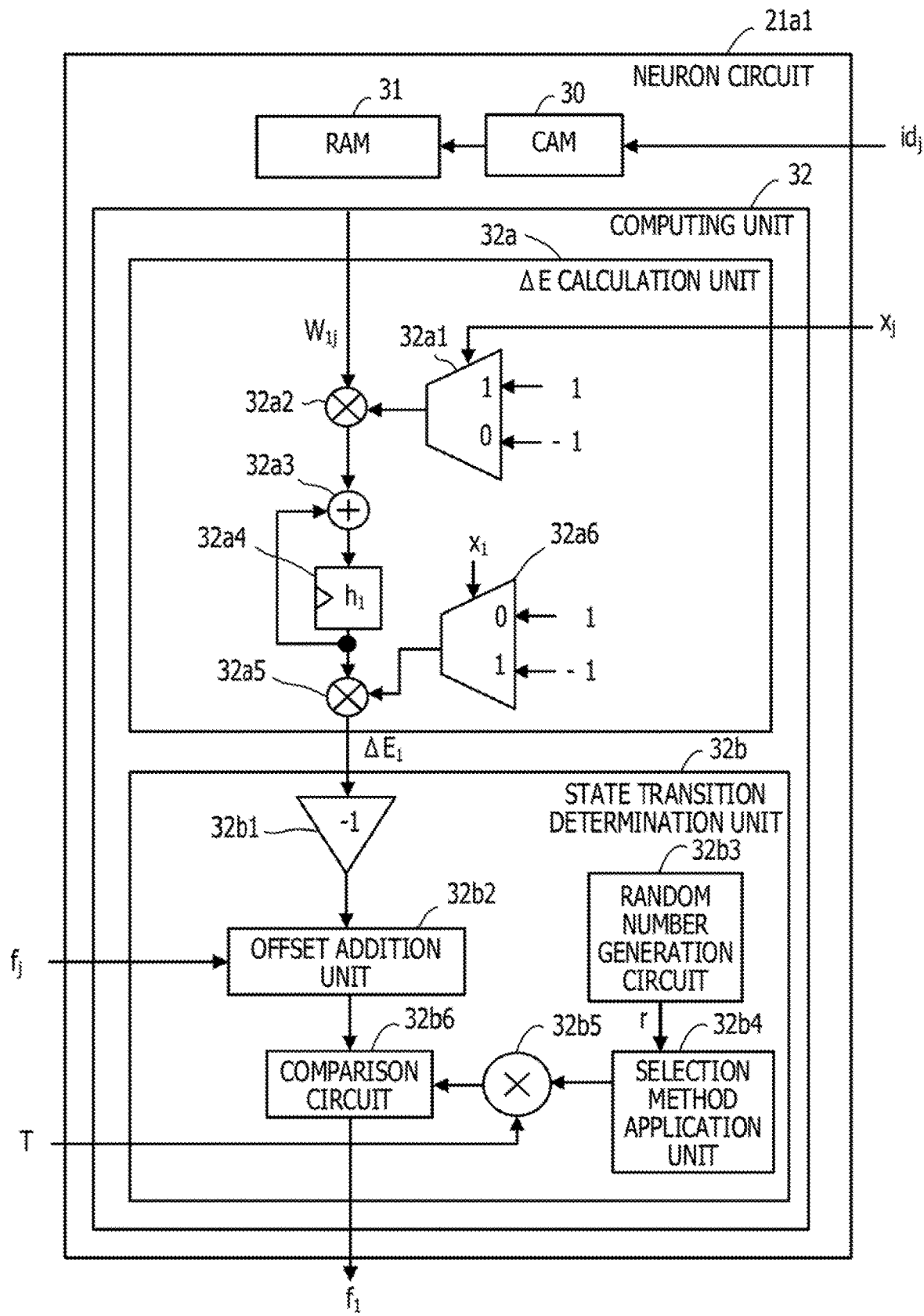
FIG. 3 is a diagram illustrating an example of a neuron circuit.

FIG. 3 is a diagram illustrating an example of a neuron circuit. Although FIG. 3 illustrates an example of the neuron circuit 21a1, the other neuron circuits 21a2 to 21an are also realized by the same circuit.

The neuron circuit 21a1 includes a CAM 30, a RAM 31, and a computing unit 32.

The CAM 30 holds an id indicating a combining destination neuron to be combined with a neuron with id=1. The CAM 30 receives $id_j$ indicating an update target neuron for which a value is to be updated, and outputs a signal indicating an id in a case where the id corresponding to $id_j$ is held. An example of the CAM 30 will be described below (refer to FIG. 4).

The RAM 31 holds a weighting coefficient indicating a strength of combining between the neuron with id=1 and the combining destination neuron, and outputs a weighting coefficient corresponding to the id indicated by the signal output from the CAM 30.

The computing unit 32 includes a ΔE calculation unit 32a and a state transition determination unit 32b.

The ΔE calculation unit 32a includes a selection circuit 32a1, a multiplier 32a2, an adder 32a3, a register 32a4, a multiplier 32a5, and a selection circuit 32a6.

The selection circuit 32a1 realizes calculation of a change in a bit value of the update target neuron (a neuron of id=$id_j$). When the bit value ($x_j$) of the update target neuron changes from 1 to 0, a change ($\Delta x_j$) becomes −1, and when $x_j$ changes from 0 to 1, $\Delta x_j$ becomes 1. When $x_j$ (a value after the update) supplied from the update control circuit 22 is 0, the selection circuit 32a1 selects and outputs −1, and when $x_j$ is 1, the selection circuit 32a1 selects and outputs 1.

The multiplier 32a2 outputs a product of the weighting coefficient output from the RAM 31 and the value output from the selection circuit 32a1. In the example in FIG. 3, a weighting coefficient $W_{1j}$ is input to the multiplier 32a2. The output of the multiplier 32a2 represents a change ($\Delta h_1$) of a local field ($h_1$) due to a change of $x_j$.

The adder 32a3 outputs a value obtained by adding a value output by the multiplier 32a2 and a value stored in the register 32a4.

The register 32a4 takes in a value ($h_1$) output by the adder 32a3 in synchronization with a dock signal (not illustrated). The register 32a4 is, for example, a flip flop. An initial value of $h_1$ stored in the register 32a4 is the bias coefficient ($b_1$) in a case where initial values of bit values of all neurons are set too.

The multiplier 32a5 outputs a product of $h_1$ output from the register 32a4 and a value output from the selection circuit 32a6. This product is the energy change ($\Delta E_1$) due to the change in the bit value of the neuron of id=1 in the equation (2).

The selection circuit 32a6 realizes calculation of in the equation (2), The selection circuit 32a6 outputs −1 when $x_1$, which is the bit value of the neuron of id=1 supplied from the update control circuit 22, is 0, and outputs 1 when $x_1$ is 1.

The state transition determination unit 32b includes a sign inversion unit 32b1, an offset addition unit 32b2, a random number generation circuit 32b3, a selection method application unit 32b4, a multiplier 32b5, and a comparison circuit 32b6.

The sign inversion unit 32b1 inverts a sign by multiplying $\Delta E_1$ by −1.

The offset addition unit 32b2 adds an offset value to the output value ($-\Delta E_1$) of the sign inversion unit 32b1. When receiving a signal ($f_j=0$) indicating that there is no neuron permitted to be updated from the update control circuit 22, the offset addition unit 32b2 increases the offset value. On the other hand, when receiving a signal ($f_1=1$) indicating that there is a neuron permitted to be updated from the update control circuit 22, the offset addition unit 32b2 sets the offset value to 0. It is easier to permit the update of the bit value of the neuron when the offset value becomes larger, and in a case where a current state (a combination of bit values of each neuron) exists in a local solution, an escape from the local solution is promoted.

The random number generation circuit 32b3 generates uniform random numbers r equal to or more than 0 and equal to or less than 1.

The selection method application unit 32b4 outputs a value based on a selection method (a metropolis method or Gibbs method) for performing simulated annealing.

In a case where simulated annealing is performed, when a permission probability A($\Delta E$, T) of the state transition which causes a certain energy change is determined as in the following equations (3) and (4), it is known that the state reaches an optimum solution at a limit of time (the number of repetitions) of infinity.

$$A(\Delta E, T) = f(-\Delta E/T) \quad (3)$$

$$f(-\Delta E/T) = \begin{cases} \min[1, \exp(-\Delta E/T)] & \text{Metropolis method} \\ 1/[1+\exp(\Delta E/T)] & \text{Gibbs method} \end{cases} \quad (4)$$

In the equations (3) and (4), T is the temperature parameter described above.

In a case of using the permission probability A($\Delta E$, T) represented by the equations (3) and (4), when a normal state is reached after sufficient reiteration, an occupancy probability of each state follows the Boltzmann distribution for a thermal equilibrium state in thermodynamics. Since the occupancy probability of a low-energy state increases when the temperature gradually decreases from high temperature, the low-energy state may be obtained when the temperature sufficiently decreases. Since the behavior is similar to a state change when annealing the material, the method is called simulated annealing. At this time, a case where the state transition in which energy increases stochastically occurs corresponds to thermal excitation in physics.

It is possible to realize a circuit which outputs a determination result (=1) indicating that state transition which causes an energy change with the permission probability A($\Delta E$,T) is permitted, by a comparator which outputs a value based on a comparison result of $f(-\Delta E/T)$ in the equations (3) and (4) and the uniform random number r.

Meanwhile, it is also possible to realize the same function even when the following modification is made. Even when the same monotonically increasing function is applied to two numbers, a magnitude relationship therebetween does not change. Therefore, even when the same monotonically increasing function is applied to two inputs of the comparator, the output of the comparator does not change. For example, it is possible to use $f^{-1}(-\Delta E/T)$ which is an inverse function of $f(-\Delta E/T)$ as a monotonically increasing function which acts on $f(-\Delta E/T)$ and $f^{-1}(r)$ obtained by setting $-\Delta E/T$ of $r^1(-\Delta E/T)$ to r as a monotonically increasing function which acts on the uniform random number (r) In this case, a circuit having the same function as the above-described comparator may be a circuit which outputs 1 when $-\Delta E/T$ is greater than $f^{-1}(r)$. Since T is positive, the circuit may be a circuit which outputs 1 when $-\Delta E$ is larger than $T \cdot f^{-1}(r)$.

The selection method application unit 32b4 outputs the value of $f^{-1}(r)$ by using a conversion table for converting the input r into the value of $f^{-1}(r)$ described above. In the case where the Metropolis method is used, $f^{-1}(r)$ is equal to $\log(r)$. The conversion table is stored, for example, in a memory such as a RAM or flash memory.

The multiplier 32b5 outputs a product $(T \cdot f^{-1}(r))$ of T supplied from the control circuit 23 and $f^{-1}(r)$. $T \cdot f^{-1}(r)$ corresponds to the thermal noise (thermal excitation energy) described above.

The comparison circuit 32b6 compares the addition result by the offset addition unit 32b2 with $T \cdot f^{-1}(r)$. In a case where the addition result is larger than $T \cdot f^{-1}(r)$, the comparison circuit 32b6 outputs a determination result ($f_1=1$) indicating that the neuron with id=1 is permitted to be updated, and when the addition result is smaller than $T \cdot f^{-1}(r)$, the comparison circuit 32b6 outputs a determination result ($f_1=0$) indicating that the update is not permitted.

The comparison circuit 32b6 compares the addition result by the offset addition unit 32b2 with $T \cdot f^{-1}(r)$. In a case where the addition result is larger than $T \cdot f^{-1}(r)$, the comparison circuit 32b6 outputs a determination result ($f_1=1$) indicating that the neuron with id=1 is permitted to be updated, and when the addition result is smaller than $T \cdot f^{-1}(r)$, the comparison circuit 32b6 outputs a determination result ($f_1=0$) indicating that the update is not permitted.

(Example of CAM 30)

Figure 4:
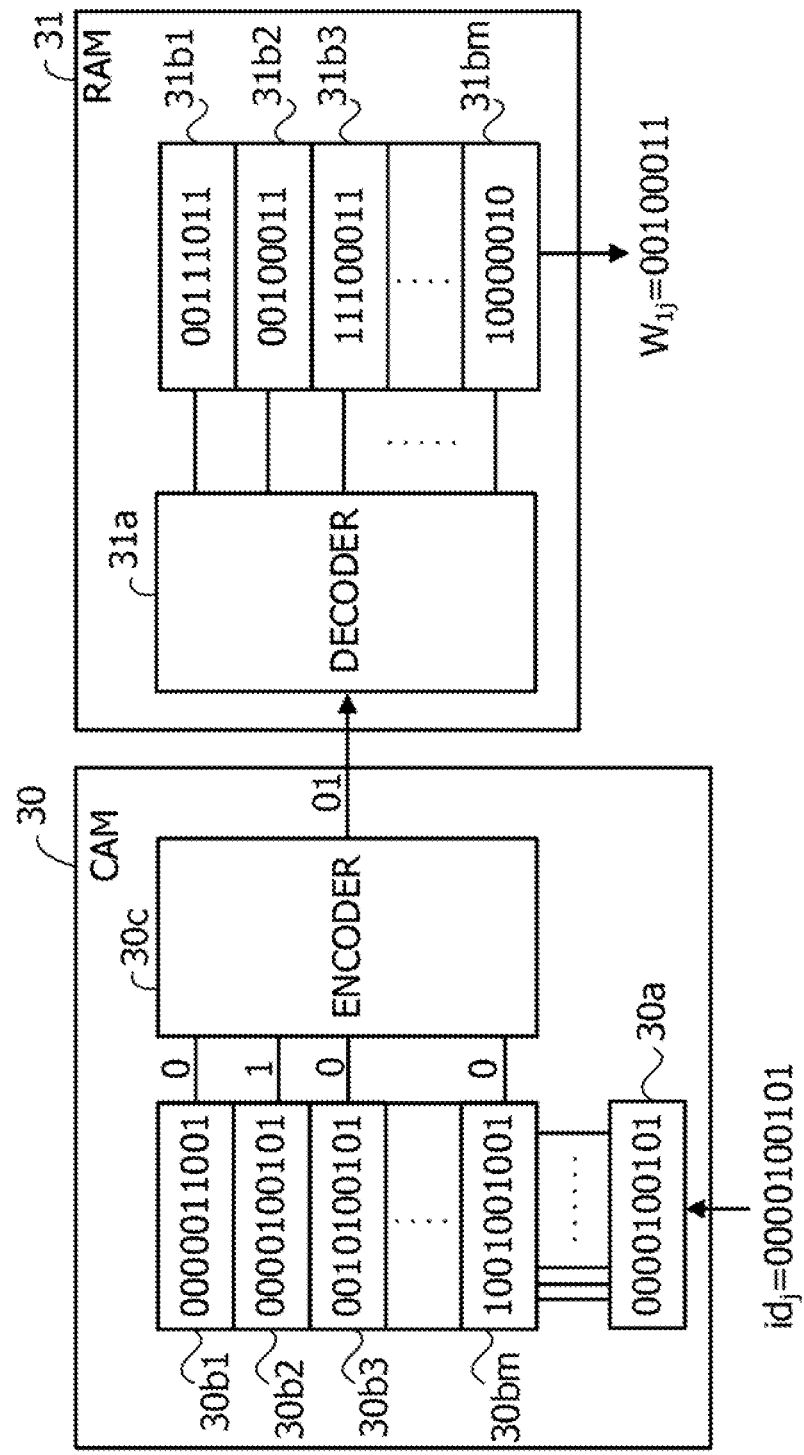
FIG. 4 is a diagram illustrating an example of a CAM.

FIG. 4 is a diagram illustrating an example of a CAM.

The CAM 30 includes input registers 30a, coincidence determination circuits 30b1, 30b2, 30b3, ..., and 30bm, and an encoder 30c.

The input register 30a holds $id_j$ indicating an update target neuron. In the example in FIG. 4, it is assumed that n which is the number of all neurons is 1024. In this case, the number of bits of id and $id_j$ is 10 bits as illustrated in FIG. 4. In a case where a maximum value of the combining number of each neuron is 32, for example, 32 coincidence determination circuits 30b1 to 30bm are provided.

Each of the coincidence determination circuits 30b1 to 30bm includes a register which holds an id indicating a neuron to be combined with the neuron with id=1 assigned to the neuron circuit 21a1 including the CAM 30. Each of the coincidence determination circuits 30b1 to 30bm outputs 1 in a case where the held id coincides with $id_j$ held in the input register 30a, and outputs 0 in a case where the id does not coincide with $id_j$.

The encoder 30c encodes a value output from the coincidence determination circuits 30b1 to 30bm and outputs an encoding result.

For example, in the example in FIG. 4, the id held in the register of the coincidence determination circuit 30b2 coincides with $id_j$, so that the coincidence determination circuit 30b2 outputs 1. In this case, the encoder 30c outputs, for example, "01".

In a case where the CAM 30 includes the encoder 30c as described above, the RAM 31 includes a decoder 31a. The decoder 31a outputs a signal for designating a storage area in which a weighting coefficient corresponding to the id indicated by the encoding result output from the encoder 30c is stored. In the example in FIG. 4, the RAM 31 includes storage areas 31b1, 31b2, 31b3, . . . , and 31bm which hold weighting coefficients of 8 bits.

In a case where a signal for designating the storage area 31b2 is output by the decoder 31a, a weighting coefficient ($W_{1,j}$=00100011) held in the storage area 31b2 is read out.

The CAM 30 may not include the encoder 30c. In this case, the RAM 31 may not include the decoder 31a. In this case, the RAM 31 reads out the weighting coefficient by designating any one of the storage areas 31b1 to 31bm according to a value output from the coincidence determination circuits 30b1 to 30bm.

(Operation Example of Optimization Apparatus 20 According to Second Embodiment (Example of Optimization Method))

Figure 5:
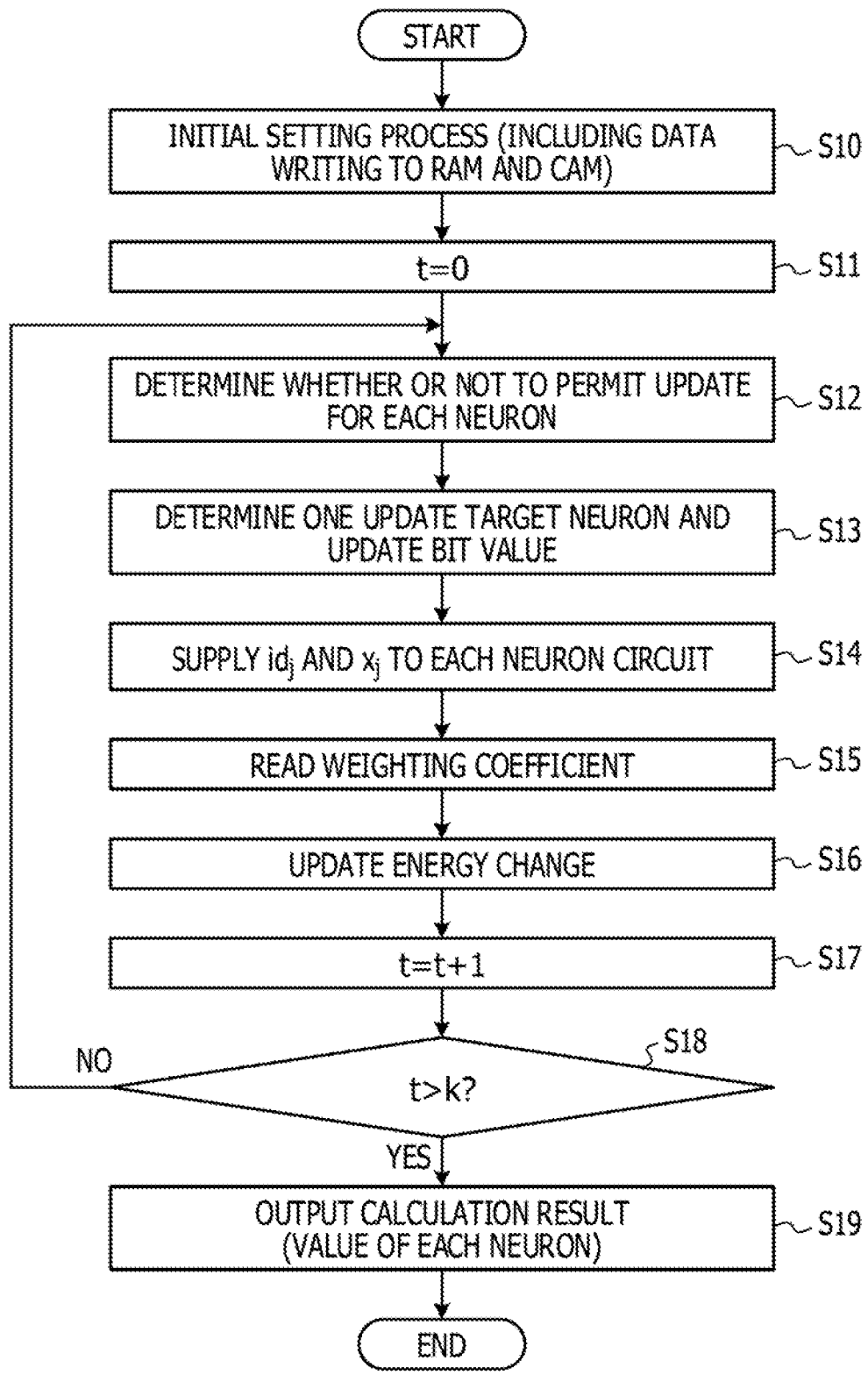
FIG. 5 is a flowchart illustrating a flow of an operation of an example of the optimization apparatus according to the second embodiment.

FIG. 5 is a flowchart illustrating a flow of an operation of an example of the optimization apparatus according to the second embodiment.

When an operation of the optimization apparatus 20 starts (for example, when power is supplied), an initial setting process is first performed (step S10). In the initial setting process, the control circuit 23 initializes, for example, holding contents in the CAM 30 or the RAM 31, holding contents in the holding unit 22a, holding contents in the register 32a4, and the like to 0 once. The control circuit 23 receives an id of a neuron to be combined with each neuron and a weighting coefficient for which a value is not 0 from the control apparatus 25, and writes the id and the weighting coefficient in the CAM 30 or the RAM 31 of the corresponding neuron circuit. The control circuit 23 receives an initial value (for example, a bias coefficient) of a local field from the control apparatus 25, and writes the initial value in the register 32a4 of the corresponding neuron circuit. The control circuit 23 also receives an annealing condition from the control apparatus 25.

Thereafter, the control circuit 23 sets a variable (t) indicating the number of repetitions to 0 (step S11).

Each of the neuron circuits 21a1 to 21an calculates an energy change or a thermal noise based on a bit value of each neuron obtained by the initial setting process, the initial value of the local field, or the like, at first time. Each of the neuron circuits 21a1 to 21an determines whether or not each neuron is permitted to be updated (whether or not an update is permitted) based on the energy change and the thermal noise (step S12). Each of the neuron circuits 21a1 to 21an performs the same process based on the bit value of each updated neuron and the updated energy change in the second and subsequent times.

The update control circuit 22 determines one update target neuron based on the determination result ($f_1$ to $f_n$) output from the neuron circuits 21a1 to 21an, and updates the bit value (step S13). In a case where there are a plurality of neurons permitted to be updated, the update control circuit 22 determines one as an update target neuron, for example, based on a random number. The update control circuit 22 supplies $id_j$ indicating the determined update target neuron and the bit value ($x_j$) after the update to each of the neuron circuits 21a1 to 21an (step S14). In a case where there is no neuron permitted to be updated, the update control circuit 22 does not update the bit value, and outputs $f_j$=0 so as to increase the offset value described above.

In a case where the CAM 30 included in each of the neuron circuits 21a1 to 21an holds an id which coincides with $id_j$, a weighting coefficient corresponding to the id is read from the RAM 31 (step S15). In a case where the weighting coefficient is read from the RAM 31, the computing unit 32 included in each of the neuron circuits 21a1 to 21an updates the energy change based on the weighting coefficient and the bit value ($x_j$) of the update target neuron (step S16).

Thereafter, the control circuit 23 sets t indicating the number of repetitions to +1 (step S17), and determines whether or not t is greater than a predetermined number (k) (step S18). In a case where t is equal to or less than k, the control circuit 23 causes the neuron circuits 21a1 to 21an to repeat the processes from step S12.

Although not illustrated in FIG. 5, in a case where simulated annealing is performed, the control circuit 23 decreases a value of the temperature parameter in accordance with the annealing condition every time t increases by a predetermined number.

In a case where t is greater than k, the control circuit 23 obtains the bit value of each neuron held in the holding unit 22a, outputs (transmits to the control apparatus 25) as a solution to the optimization problem (step S19), and terminates the operation of the optimization apparatus 20.

In a case where the holding unit 22a holds the bit value of each neuron when the minimum value or minimum value of energy is obtained, the control circuit 23 obtains the held information after the process of determining an update target neuron is repeated for a predetermined number of times. The control circuit 23 may transmit the obtained information to the control apparatus 25.

As described above, the optimization apparatus 20 according to the second embodiment has the same advantage as that of the optimization apparatus 10 according to the first embodiment. For example, it is possible to reduce a capacity of the RAM 31 which stores the weighting coefficients as illustrated in FIG. 4. For example, in a case where the maximum value of the combining number of each neuron is 32, the RAM 31 having a capacity for holding 32 weighting coefficients may be used. Therefore, it is possible to calculate a larger scale optimization problem by the optimization apparatus 20 with one chip, for example.

Since the CAM 30 generally has a small delay time, there is little decrease in the calculation time due to addition of the CAM 30.

Third Embodiment

Figure 6:
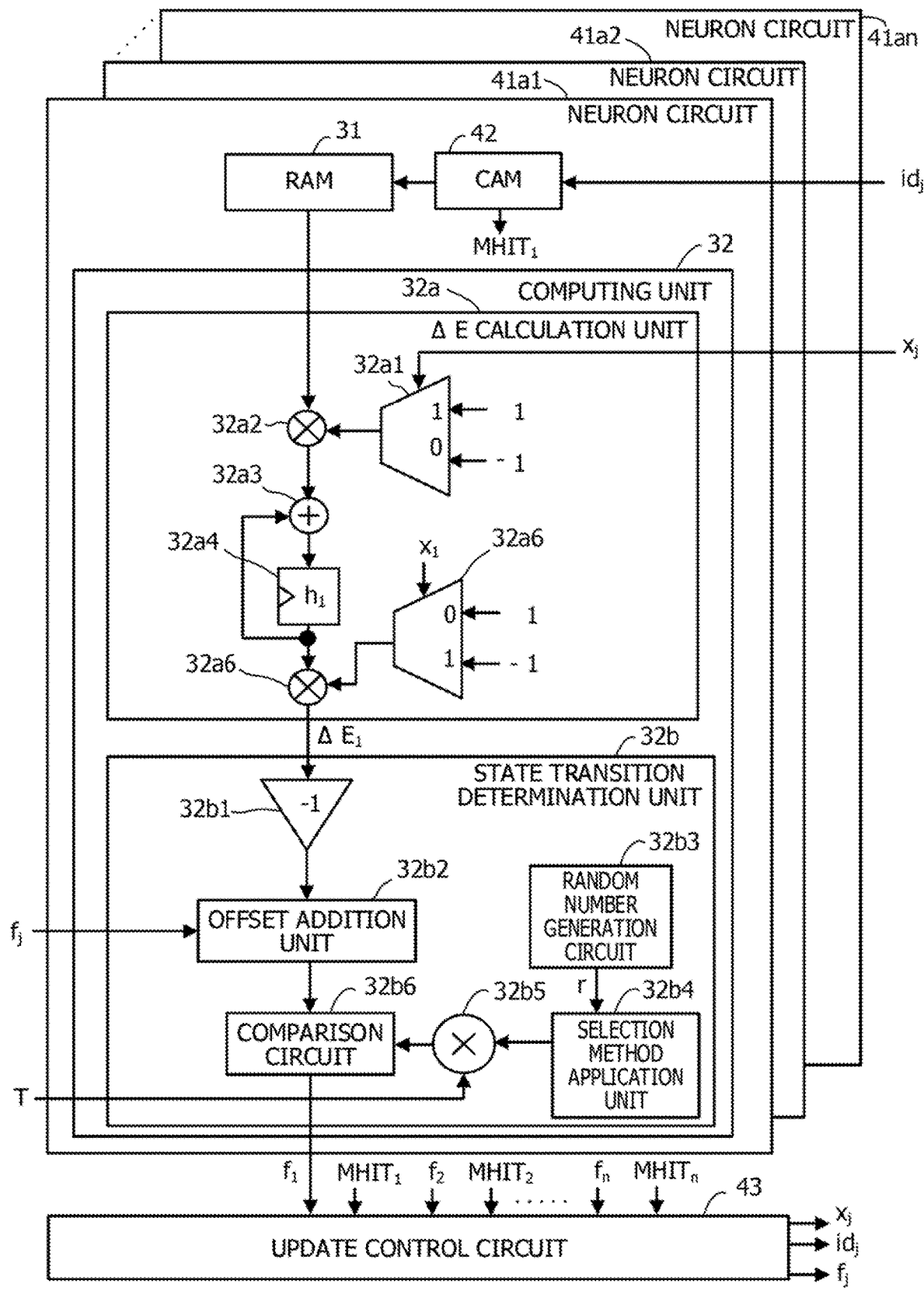
FIG. 6 is a diagram illustrating an example of an optimization apparatus according to a third embodiment.

FIG. 6 is a diagram illustrating an example of an optimization apparatus according to a third embodiment. In FIG. 6, the same elements as those illustrated in FIG. 3 are assigned with the same reference numerals. In FIG. 6, the control circuit 23 illustrated in FIG. 2 is not illustrated.

In an optimization apparatus 40 according to the third embodiment, a CAM 42 of a neuron circuit 41a1 outputs coincidence determination information ($MHIT_1$) indicating whether or not combining destination information (id) corresponding to $id_j$ is held. In the following description, it is assumed that the CAM 42 outputs $MHIT_1=0$ in a case where an id corresponding to $id_j$ is held, and outputs $MHIT_1=1$ in a case where the id corresponding to $id_j$ is not held.

The neuron circuits 41a2 to 41an have the same circuit configuration as that of the neuron circuit 41a1. The neuron circuits 41a2 to 41an outputs a determination result ($f_2$ to $f_n$) of whether or not to permit neurons with id=2 to n to be updated, and also outputs coincidence determination information ($MHIT_2$ to $MHIT_n$) indicating whether or not an id corresponding to $id_j$ is held.

In a case where the determination result output by the neuron circuit which outputs coincidence determination information having a value of 1 among the neuron circuits 41a1 to 41an permits an update of the neuron, an update control circuit 43 determines the neuron as one of update target neurons.

(Example of CAM 42 in Optimization Apparatus 40 According to Third Embodiment)

Figure 7:
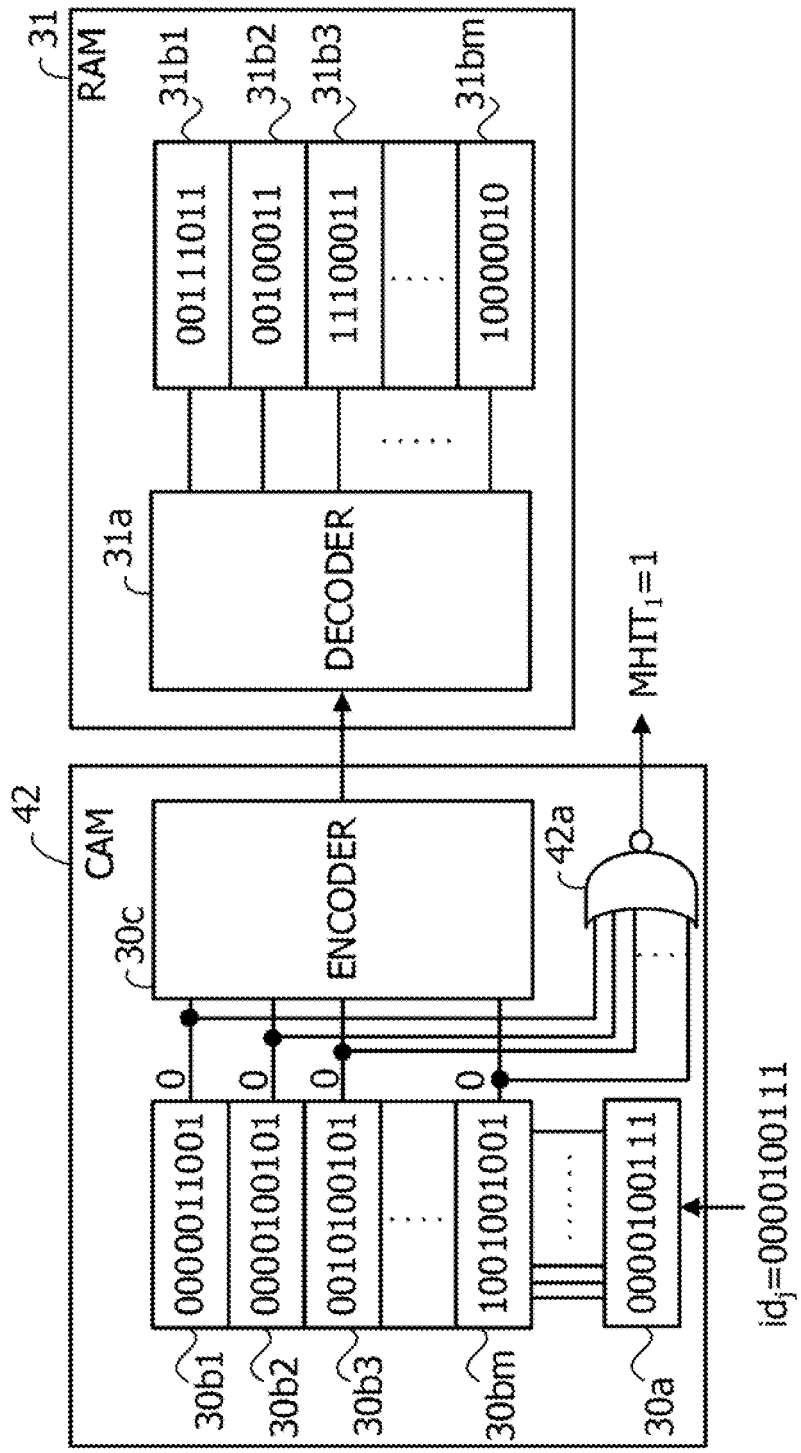
FIG. 7 is a diagram illustrating an example of a CAM in the optimization apparatus according to the third embodiment.

FIG. 7 is a diagram illustrating an example of a CAM in the optimization apparatus according to the third embodiment. In FIG. 7, the same elements as those illustrated in FIG. 4 are assigned with the same reference numerals.

The CAM 42 includes a negative OR (NOR) circuit 42a. The NOR circuit 42a outputs $MHIT_1$, which is a negative OR of output values of the respective coincidence determination circuits 30b1 to 30bm.

As illustrated in FIG. 7, in a case where an id which coincides with $id_j$ is not held in all of the coincidence determination circuits 30b1 to 30bm, output values of the coincidence determination circuits 30b1 to 30bm become 0, and the NOR circuit 42a outputs $MHIT_1=1$. In a case where the id which coincides with $id_3$ is held in any one of the coincidence determination circuits 30b1 to 30bm, an output value of the any one of the coincidence determination circuits 30b1 and 30bm becomes 1, and the NOR circuit 42a outputs $MHIT_1=0$.

(Example of Update Control Circuit 43 in Optimization Apparatus 40 According to Third Embodiment)

Figure 8:
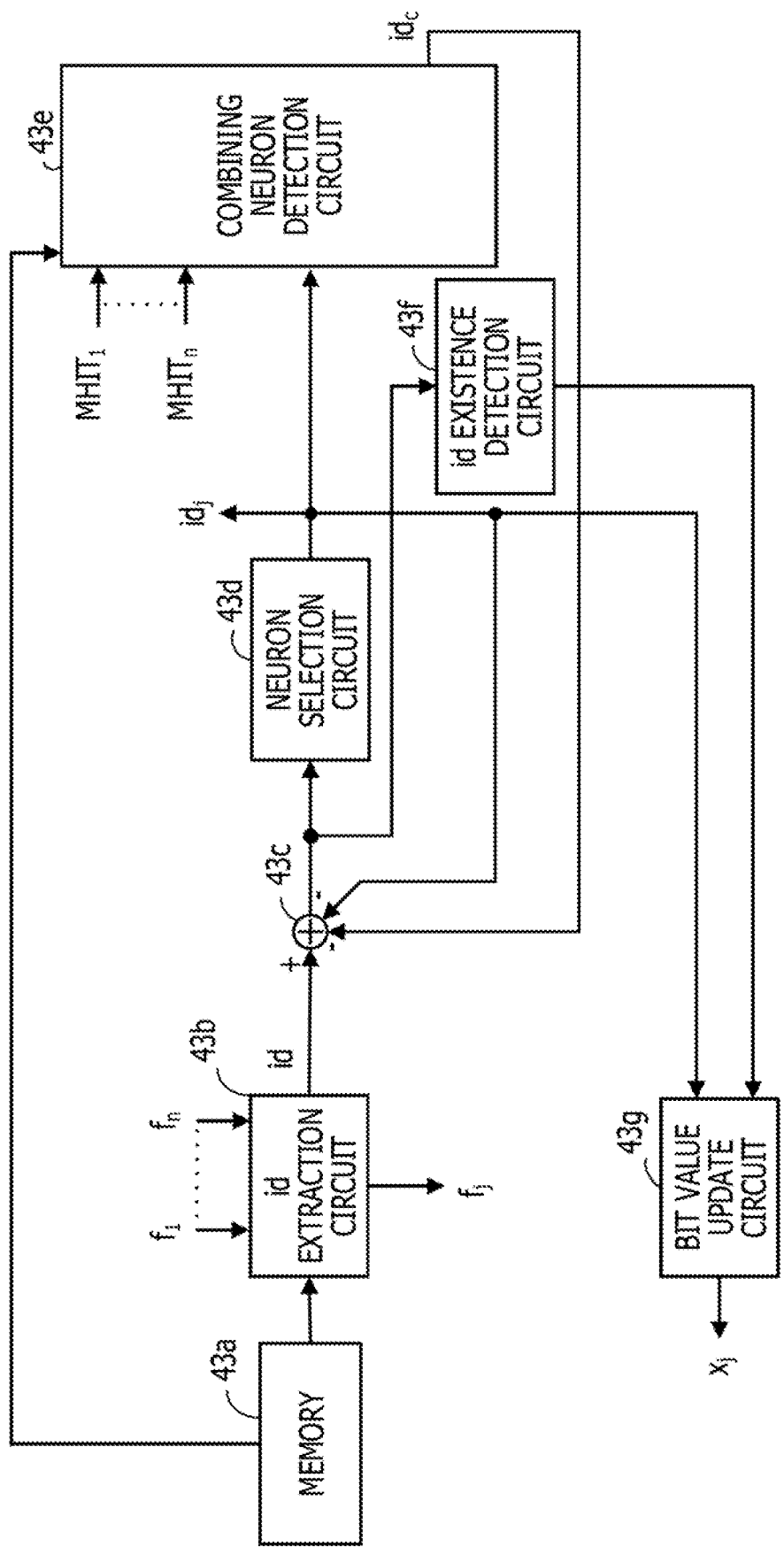
FIG. 8 is a diagram illustrating an example of an update control circuit in the optimization apparatus according to the third embodiment.

FIG. 8 is a diagram illustrating an example of an update control circuit in the optimization apparatus according to the third embodiment.

The update control circuit 43 includes a memory 43a, an id extraction circuit 43b, an addition circuit 43c, a neuron selection circuit 43d, a combining neuron detection circuit 43e, an id existence detection circuit 43f, and a bit value update circuit 43g.

The memory 43a stores an id indicating each neuron. As the memory 43a, for example, a semiconductor memory device such as a register, a RAM, and a flash memory may be used. In a case where each of the neuron circuits 41a1 to 41an holds an own id and the id is supplied to the update control circuit 43 together with $f_1$ to $f_n$ and $MHIT_1$ to $MHIT_n$, the memory 43a may not be provided.

The id extraction circuit 43b extracts an id assigned to a neuron circuit which outputs a determination result having a value is 1 among the determination results ($f_1$ to $f_n$) output from each of the neuron circuits 41a1 to 41an, from the memory 43a, and outputs the id. The id extraction circuit 43b outputs f=0 in a case where all of $f_1$ to $f_n$ are 0, and outputs $f_j=1$ in a case where a value of at least one of $f_1$ to $f_n$ is 1.

In a case where there are a plurality of ids extracted by the id extraction circuit 43b, the addition circuit 43c deletes $id_j$ output by the neuron selection circuit 43d and $id_c$ output by the combining neuron detection circuit 43e among the plurality of ids.

The neuron selection circuit 43d selects $id_j$ indicating an update target neuron from an id output from the addition circuit 43c. For example, in a case where there are a plurality of ids output from the addition circuit 43c, the neuron selection circuit 43d selects one of the ids at random, or selects an id having the minimum (or the maximum) value as $id_j$.

Based on $MHIT_1$ to $MHIT_n$ output from the respective neuron circuits 41a1 to 41an, the combining neuron detection circuit 43e extracts an id indicating a neuron to be combined with the update target neuron represented by $id_j$ from the memory 43a, and outputs the id as $id_c$. Among $MHIT_1$ to $MHIT_n$, an id assigned to a neuron circuit which outputs coincidence determination information having a value of 0 is output as $id_c$. For example, the id of the neuron to be combined with the update target neuron is output as $id_c$.

The id existence detection circuit 43f detects the presence or absence of the id output from the addition circuit 43c. The detection result output from the id existence detection circuit 43f is supplied to the bit value update circuit 43g, and is also supplied to the control circuit 23.

The bit value update circuit 43g has a holding unit (not illustrated) which holds a bit value of each neuron, updates (inverts from 0 to 1 or from 1 to 0) the bit value of the update target neuron indicated by $id_j$, and outputs the bit value ($x_j$) after the update. In a case where the id existence detection circuit 43f detects that the id does not exist, the bit value update circuit 43g does not update the bit value.

In the update control circuit 43, the update is permitted for neurons other than a neuron to be combined with an update target neuron detected based on $MHIT_1$ to $MHIT_n$. For example, in a case where $f_1$, $f_2=1$, the id extraction circuit 43b outputs id=1, 2. The neuron selection circuit 43d outputs id=1 as $id_j$, for example. Therefore, the bit value of the neuron with id=1 is updated.

In a case where the neuron with id=1 and the neuron with id=2 are not combined to each other, $MHIT_{2=1}$. Therefore, id=2 is not output as $id_c$. At this time, since the addition circuit 43c deletes id=1 output by the neuron selection circuit 43d among id=1, 2, the neuron selection circuit 43d outputs id=2 as $id_j$. Therefore, the bit value of the neuron with id=2 is updated.

(Operation Example of Optimization Apparatus 4 According to Third Embodiment (Example of Optimization Method))

FIG. 9 is a flowchart illustrating a flow of an operation of an example of the optimization apparatus according to the third embodiment.

The processes in steps S20, S21, and 522 are the same as the processes in steps S10 to S12 illustrated in FIG. 5. In the process in step S23, the neuron selection circuit 43d of the update control circuit 43 illustrated in FIG. 8 determines one update target neuron, and the bit value update circuit 43g updates the bit value ($x_j$) of the update target neuron. In the process in step S24, $id_j$ output from the neuron selection circuit 43d and $x_j$ output from the bit value update circuit 43g are respectively supplied to the neuron circuits 41a1 to 41an. The subsequent processes in steps S25 and 526 are the same as those in steps S15 and S16 illustrated in FIG. 5.

In the process in step S27, the addition circuit 43c of the update control circuit 43 illustrated in FIG. 8 deletes $id_c$ and $id_j$ from the id output from the id extraction circuit 43b. In the process in step S28, the id existence detection circuit 43f detects whether or not there is an id output from the addition circuit 43c (whether or not the id remains). In a case where the id remains, the processes from step S23 are repeated. In a case where the id does not remain, the process in step S29 is performed. The processes in steps S29, S30, and 531 are the same as the processes in step S17 to S19 illustrated in FIG. 5.

Although not illustrated in FIG. 9, in a case where simulated annealing is performed, the control circuit 23 decreases a value of the temperature parameter in accordance with the annealing condition every time t increases by a predetermined number.

As described above, the optimization apparatus 40 according to the third embodiment has the same advantage as that of the optimization apparatus 20 according to the second embodiment. According to the optimization apparatus 40, in a case where bit values of a plurality of neurons are permitted to be updated, it is possible to update the bit values at the same time for neurons having no combining. Even when the bit values are updated at the same time with respect to the neurons having no combining, convergence to the optimum solution does not deteriorate.

By using the $MHIT_1$ to $MHIT_n$ as described above, it is possible to detect a neuron not combined with an update target neuron even when a weighting coefficient having a value of 0 is not held.

As described above, one aspect of an optimization apparatus and an optimization method of the embodiment has been described in accordance with the embodiment, such aspect is a mere example and not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization apparatus comprising:
a plurality of neuron circuits respectively including:
a first memory that stores combining destination information indicating a combining destination neuron to be combined with a target neuron which is one of a plurality of neurons corresponding to a plurality of spins of an Ising model obtained by converting an optimization problem, receives update target information indicating an update target neuron for which a value is to be updated, and outputs a signal indicating the combining destination information which coincides with the update target information,
a second memory that stores a weighting coefficient indicating a strength of combining between the target neuron and the combining destination neuron, and outputs the weighting coefficient corresponding to the combining destination information indicated by the signal output from the first memory, and
a computing circuit that stochastically permits an update of a value of the target neuron by using the weighting coefficient output from the second memory and a change of the value by a spin of a bit of the update target neuron, and outputs a determination result indicating whether the value of the target neuron is permitted to be updated, and
respectively configured to output the determination result for the target neuron different from each other; and
an update control circuit configured to determine the update target neuron based on a plurality of determination results output from the plurality of neuron circuits, update the value of the update target neuron, and output the update target information.

2. The optimization apparatus according to claim 1, wherein the first memory outputs coincidence determination information indicating whether the combining destination information which coincides with the update target information is held, and
when a neuron circuit of the plurality of neuron circuits which outputs the coincidence determination information indicating that the combining destination information which coincides with the update target information is not held outputs the determination result indicating that the value of the target neuron is permitted to be updated, the update control circuit determines the target neuron as one of the update target neurons.

3. The optimization apparatus according to claim 1, wherein the first memory is a content-addressable memory.

4. An optimization method comprising:
storing, by a first memory included in each of the plurality of neuron circuits, combining destination information indicating a combining destination neuron to be combined with a target neuron which is one of a plurality of neurons corresponding to a plurality of spins of an Ising model obtained by converting an optimization problem, the target neuron being different in a plurality of neuron circuits, receiving update target information indicating an update target neuron for which a value is to be updated, and outputting a signal indicating the combining destination information which coincides with the update target information;
storing, by a second memory included in each of the plurality of neuron circuits, a weighting coefficient indicating a strength of combining between the target neuron and the combining destination neuron, and outputting the weighting coefficient corresponding to the combining destination information indicated by the signal output from the first memory;
stochastically permitting, by a computing circuit included in each of the plurality of neuron circuits, an update of a value of the target neuron by using the weighting coefficient output from the second memory and a change of the value by a spin of a bit of the update target neuron, and outputting a determination result indicating whether the value of the target neuron is permitted to be updated; and
determining, by an update control circuit, the update target neuron based on the plurality of determination results respectively output from the computing circuits of a plurality of the neuron circuits, updating the value of the update target neuron, and outputting the update target information.

* * * * *